US010652162B2

(12) United States Patent
Biederman et al.

(10) Patent No.: US 10,652,162 B2
(45) Date of Patent: May 12, 2020

(54) SCALABLE PACKET PROCESSING

(71) Applicant: Intel Corporation, Santa Clara, CA (US)

(72) Inventors: Dan Christian Biederman, Saratoga, CA (US); Matthew James Webb, Woodland Hills, CA (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 16/024,749

(22) Filed: Jun. 30, 2018

(65) Prior Publication Data

US 2019/0044876 A1    Feb. 7, 2019

(51) Int. Cl.
| | |
|---|---|
| *H04L 12/805* | (2013.01) |
| *H04L 12/721* | (2013.01) |
| *H04L 29/06* | (2006.01) |
| *H04L 29/08* | (2006.01) |

(52) U.S. Cl.
CPC ............ *H04L 47/365* (2013.01); *H04L 45/66* (2013.01); *H04L 69/22* (2013.01); *H04L 69/324* (2013.01); *H04L 63/0428* (2013.01); *H04L 63/12* (2013.01); *H04L 63/162* (2013.01); *H04L 63/20* (2013.01)

(58) Field of Classification Search
CPC ....... H04L 45/66; H04L 47/365; H04L 69/22; H04L 69/324
See application file for complete search history.

(56) References Cited

U.S. PATENT DOCUMENTS

| | | | |
|---|---|---|---|
| 7,103,038 B1 | 9/2006 | Gaudet | |
| 8,005,101 B1 * | 8/2011 | Kleyman | H04L 45/60 370/389 |
| 8,599,687 B1 * | 12/2013 | Kleyman | H04L 45/60 370/230 |
| 9,760,514 B1 * | 9/2017 | Hanscom | G06F 13/36 |
| 2009/0063665 A1 * | 3/2009 | Bagepalli | H04L 63/166 709/222 |
| 2009/0319704 A1 * | 12/2009 | Ekner | H04L 45/583 710/54 |
| 2011/0072172 A1 * | 3/2011 | Rodrigues | G06F 13/385 710/52 |
| 2011/0268119 A1 * | 11/2011 | Pong | H04L 47/32 370/392 |
| 2011/0273459 A1 * | 11/2011 | Letellier | G06F 15/80 345/505 |
| 2012/0266181 A1 * | 10/2012 | Carney | H04L 45/60 718/105 |
| 2014/0281844 A1 | 9/2014 | Jiang et al. | |
| 2015/0138976 A1 * | 5/2015 | Lu | H04L 49/1546 370/235 |

(Continued)

OTHER PUBLICATIONS

European Extended Search Report in European Patent Application No. 19177469.4 dated Oct. 19, 2019, 11 pages.

*Primary Examiner* — Gary Mui
(74) *Attorney, Agent, or Firm* — Patent Capital Group

(57) ABSTRACT

Particular embodiments described herein provide for an electronic device that includes at least one processor operating at eight hundred (800) megahertz and can be configured to receive a data stream, parse packets in the data stream, and process at least two (2) full packets from the data stream in a single clock cycle. In an example, the data stream is at least a two hundred (200) gigabit Ethernet data stream and a bus width is at least thirty-two (32) bytes.

25 Claims, 11 Drawing Sheets

(56) References Cited

U.S. PATENT DOCUMENTS

| | | | |
|---|---|---|---|
| 2018/0089124 A1* | 3/2018 | Hanscom | G06F 13/36 |
| 2018/0089136 A1* | 3/2018 | Hanscom | G06F 13/4282 |
| 2018/0191629 A1* | 7/2018 | Biederman | H04L 47/6225 |
| 2018/0191631 A1* | 7/2018 | Biederman | H04L 47/6275 |
| 2018/0191632 A1* | 7/2018 | Biederman | H04L 45/20 |
| 2018/0335824 A1* | 11/2018 | MacNamara | G06F 1/266 |
| 2018/0336071 A1* | 11/2018 | Zaifman | G06F 9/5083 |
| 2019/0007330 A1* | 1/2019 | Browne | H04L 47/522 |
| 2019/0044657 A1* | 2/2019 | Biederman | H04L 1/0061 |

* cited by examiner

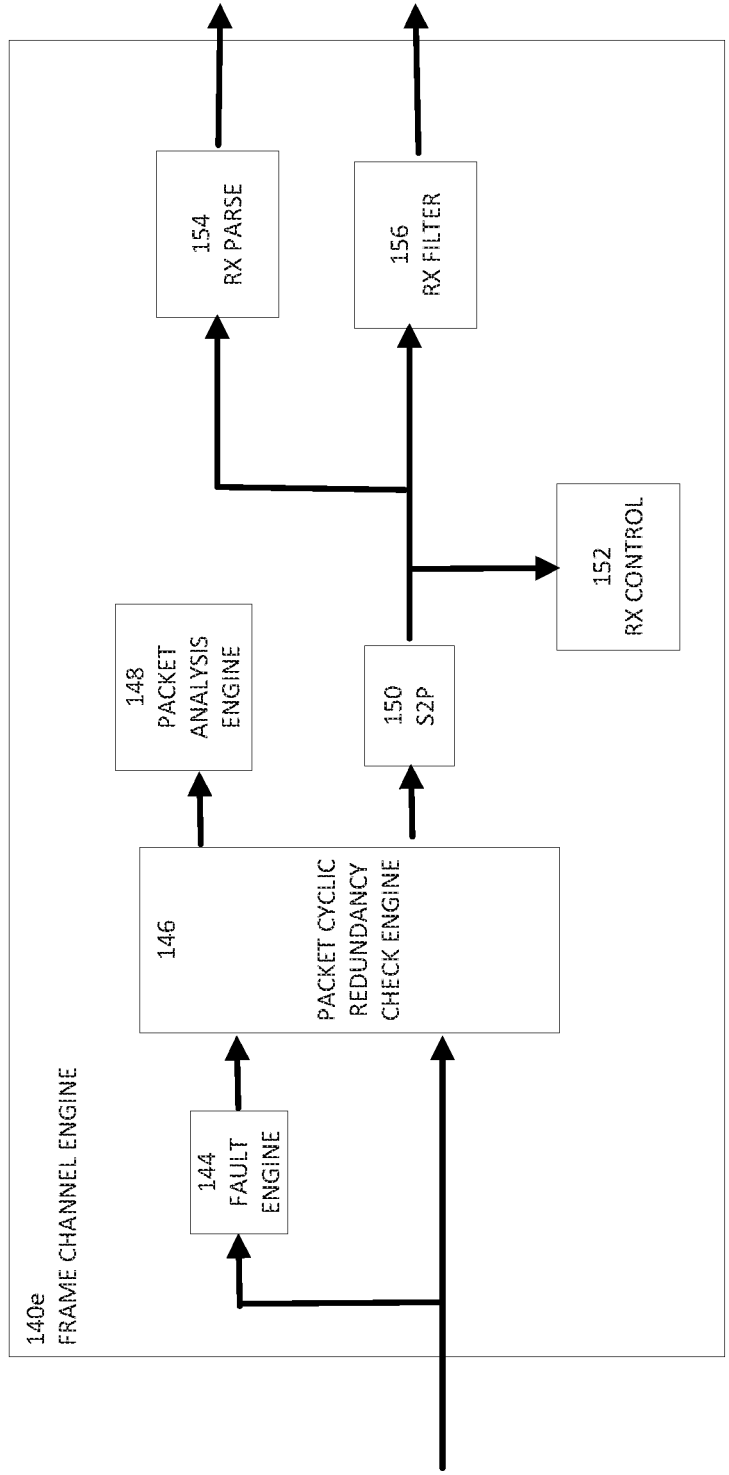

| RAW SPEED | PORTS | POSSIBLE PACKETS | WIDTH |
|---|---|---|---|
| 1.6 Tbps | 1 | 4 | 256 B |
| 800 Gbps | 2 | 3 | 128 B |
| 400 Gbps | 4 | 2 | 64 B |
| 200 Gbps | 8 | 2 | 32 B |
| 100 Gbps | 16 | 1 | 16 B |

FIGURE 6

SCALABLE PACKET PROCESSING

TECHNICAL FIELD

This disclosure relates in general to the field of computing and/or networking, and more particularly, to scalable packet processing.

BACKGROUND

Emerging network trends in data centers and cloud systems place increasing performance demands on a system. The increasing demands can cause an increase of the use of resources in the system. The resources have a finite capability and each of the resources need to be managed. One factor of effectively managing resources is the ability to quickly process packets.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4A is a block diagram of a portion of a system to enable scalable packet processing, in accordance with an embodiment of the present disclosure;

FIG. 6 is a block diagram of a table illustrating examples details of a system to enable scalable packet processing, in accordance with an embodiment of the present disclosure;

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to a system, method, apparatus, etc. for scalable packet processing, in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1A:
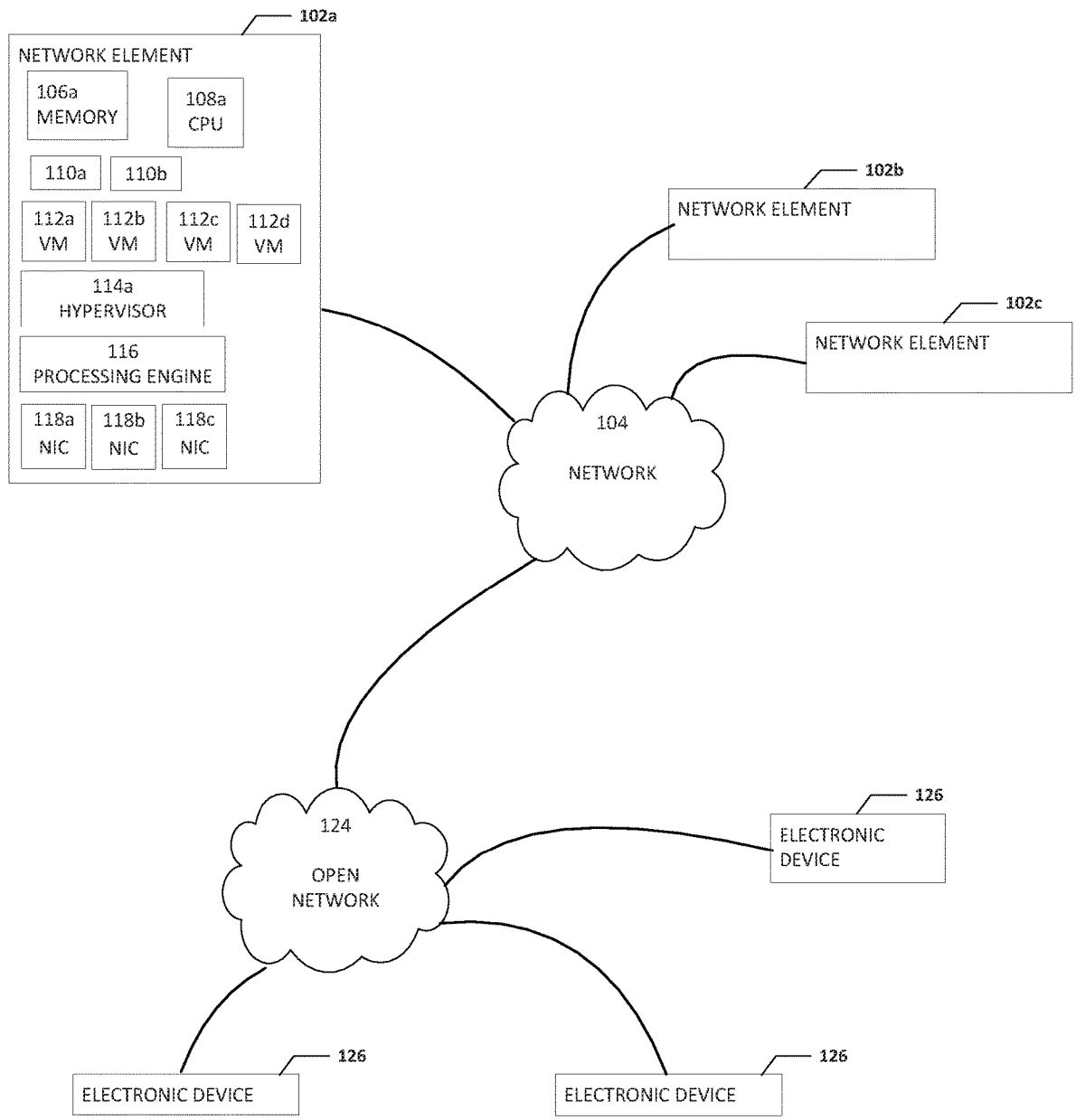
FIG. 1A is a block diagram of a system to enable scalable packet processing, in accordance with an embodiment of the present disclosure.

FIG. 1A is a simplified block diagram of a system configured to enable scalable packet processing, in accordance with an embodiment of the present disclosure. In an example, a system 100 can include one or more network elements 102a-102c. Each network element 102a-102c can be in communication with each other using network 104. In an example, network elements 102a-102c and network 104 are part of a data center. Network elements 102a-102c can each include memory, one or more computer processing units (CPUs), one or more processes, one or more virtual machines (VMs), a hypervisor, a processing engine, and one or more network interface controllers (NICs). For example, network element 102a includes memory 106a, a computer processing unit (CPU) 108a, one or more processes 110a and 110b, one or more virtual machines 112a-112d, a hypervisor 114a, a processing engine 116, and one or more network interface controllers (NICs) 118a-118c. Each NIC 118a-118c can be an Ethernet port.

CPU 108a can include one or more cores or sockets. Hypervisor 114a can be configured as a virtual machine manager (VMM). Hypervisor 114a can be computer software, firmware or hardware that creates and runs VMs (e.g., VMs 112a-112d). A VM is a software computer that, like a physical computer, runs an operating system and applications. The VM is comprised of a set of specification and configuration files and is backed by the physical resources of a host.

A computer (e.g., network element 102a) on which a hypervisor runs one or more VMs is called a host machine, and each VM is called a guest machine. The hypervisor presents the guest operating systems with a virtual operating platform and manages the execution of the guest operating systems. Multiple instances of a variety of operating systems may share the virtualized hardware resources: for example, Linux, Windows, and macOS instances can all run on a single physical x86 machine. This contrasts with operating-system-level virtualization, where all instances (usually called containers) must share a single kernel, though the guest operating systems can differ in user space, such as different Linux distributions with the same kernel. Hypervisor 114a can be configured to allow multiple VMs, commonly referred to as guests and/or guest OSs, to run concurrently on network element 102a. It is so named because it is conceptually one level higher than a supervisory program. Multiple instances of a variety of VMs may share virtualized hardware resources.

Hypervisor 114a presents a virtual operating platform to each VM and manages the execution of each VM. Multiple instances of a variety of VMs may share virtualized hardware resources. Each process 110a and 110b may be a process, application, function, virtual network function (VNF), etc. NICs 120a-120c, (also known as a network interface card, network adapter, LAN adapter or physical network interface, and other similar terms) can be a computer hardware component that connects a network element (e.g., network element 102a) to a network (e.g., network 104). Early network interface controllers were commonly implemented on expansion cards that plugged into a computer bus. The low cost and ubiquity of the Ethernet standard means that most newer computers have a network interface built into the motherboard. Modern network interface controllers offer advanced features such as interrupt and DMA interfaces to the host processors, support for multiple receive and transmit queues, partitioning into multiple logical interfaces, and on-controller network traffic processing such as the TCP offload engine. Network 104 can be in communication with open network 124 (e.g., the Internet). Open network 124 can be in communication with electronic devices 126. Electronic devices 126 may be user equipment, cloud services, or some other type of electronic device that is in communication with network 104 through open network 124.

Figure 1B:
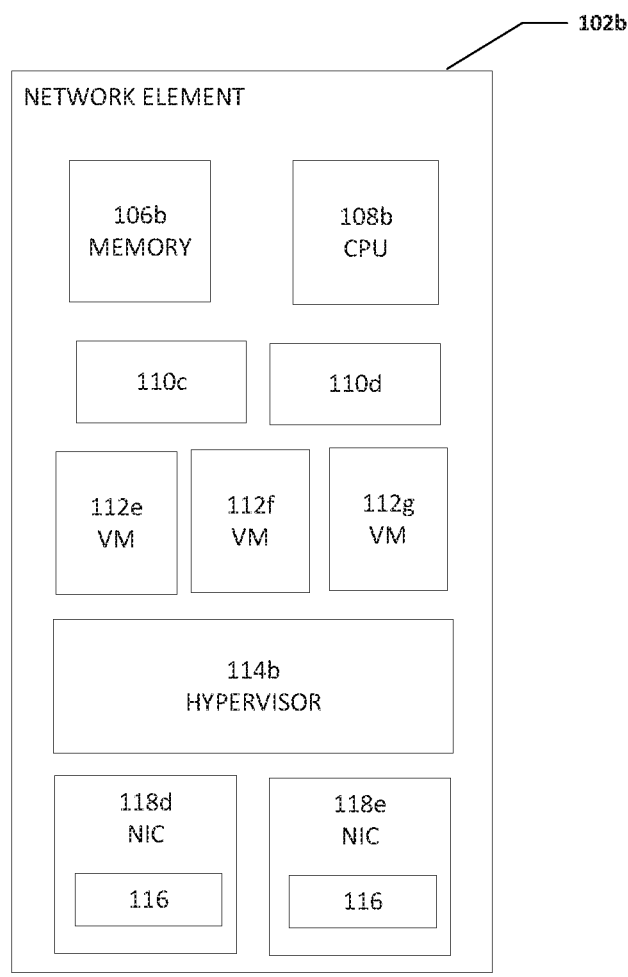
FIG. 1B is a block diagram of a portion of a system to enable scalable packet processing, in accordance with an embodiment of the present disclosure.

In an example, each NIC can include a processing engine 116. For example, as illustrated in FIG. 1B, network element 102b includes memory 106b, a CPU 108b, one or more processes 110c and 110d, one or more virtual machines 112e-112g, hypervisor 114b, and one or more NICs 118d and 118e. NIC 118d and 118e can each include processing engine 116.

Processing engine 116 can be configured to allow three or more packets to be processed in a single clock cycle without scaling the frequency of the network element to match the network speed. For example, in an Ethernet system, a four hundred (400) gigabit (G) Ethernet data path to a network element running at eight hundred (800) megahertz (MHz) could scale to a 1.6 terabyte (TB) Ethernet data path to the network element and the network element can still process three or more packets in a single eight hundred (800) MHz clock cycle. In an example, processing engine 116 can receive a data stream and split the data stream into the individual packets. The individual packets can be processed in a single clock cycle and merged back into a single data stream. The packets do not need to be related and can be different flows, different types of packets, destined to different processors from different endpoints, etc. As the packets move through processing engine 116, metadata can be created, changed, altered, removed, and/or passed along with the packet/packets sent across. For example, in the receive direction, an arrival time can be sent with each packet (i.e. IEEE1588, NTP, etc.) as it moves through processing engine 116. If there is more than one packet being processed, each packet would have metadata associated with it. Thus, if there are three (3) packets, there could be a different timestamp associated with each one of the three (3) different packets. The metadata associated with each packet and/or packet contents could include metadata related to length, cyclic redundancy check (CRC) error, parsed information, header information, etc.

In an illustrative example, a 1.6 TB scalable Ethernet data path connects to a network element that has a two hundred and fifty-six (256) byte data path and operates at an eight hundred (800) MHz clock cycle. In a single clock cycle, processing engine 116 can parse the packets and identify the end location of any packet being processed in the data stream and the start and end of any other packets in the two hundred and fifty-six (256) byte data-stream. Any complete sixty-four (64) byte or larger packets are routed to the correct processing unit for processing. Also, any started packet can be routed for processing when the remaining packet segments arrive. The processing of all valid segments can be done in parallel and multiple valid packets to be processed can be passed down the communication path in the data stream.

It is to be understood that other embodiments may be utilized and structural changes may be made without departing from the scope of the present disclosure. Substantial flexibility is provided by system 100 in that any suitable arrangements and configuration may be provided without departing from the teachings of the present disclosure. Elements of FIG. 1 may be coupled to one another through one or more interfaces employing any suitable connections (wired or wireless), which provide viable pathways for network (e.g., network 104, etc.) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

For purposes of illustrating certain example techniques of system 100, the following foundational information may be viewed as a basis from which the present disclosure may be properly explained. End users have more media and communications choices than ever before. A number of prominent technological trends are currently afoot (e.g., more computing devices, more online video services, more Internet traffic), and these trends are changing the media delivery landscape. Data centers serve a large fraction of the Internet content today, including web objects (text, graphics, Uniform Resource Locators (URLs) and scripts), downloadable objects (media files, software, documents), applications (e-commerce, portals), live streaming media, on demand streaming media, and social networks. In addition, devices and systems, such as data centers, are expected to increase performance and function. However, the increase in performance and/or function can cause bottlenecks within the resources of the system and electronic devices in the system. One cause of the bottlenecks is the ability to quickly process packets in a data stream.

An application-specific integrated circuit (ASIC) is an integrated circuit customized for a particular use, rather than intended for general-purpose use. As feature sizes have shrunk and design tools improved over the years, the possible maximum complexity (and hence functionality) in an ASIC has grown from 5,000 logic gates to over 100 million logic gates. Modern ASICs often include entire microprocessors, memory blocks including ROM, RAM, EEPROM, flash memory, etc. and other large building blocks. Such an ASIC is often termed a system-on-chip (SoC). The CPU includes electronic circuitry that, at a clock rate, carries out the instructions of a computer program by performing the basic arithmetic, logical, control and input/output (I/O) operations specified by the instructions. The clock rate of the CPU typically refers to the frequency at which a chip like a CPU, one core of a multi-core processor, is running and is used as an indicator of the processor's speed. The frequency of the clock pulses determines the rate at which a CPU executes instructions and, consequently, the faster the clock, the more instructions the CPU will execute each second.

Current ASIC frequencies are not increasing as fast as the bandwidth of most networks. For example, regarding Ethernet bandwidth, in the near future, bus widths will be larger than two sixty-four (64) byte packets. Bandwidth is the maximum rate of data transfer across a given path. Bandwidth may be characterized as network bandwidth, data bandwidth, or digital bandwidth. The term bandwidth sometimes defines the net bit rate (e.g., peak bit rate, information rate, or physical layer useful bit rate), channel capacity, or the maximum throughput of a logical or physical communication path in a digital communication system. Because current ASIC frequencies are not increasing as fast as the bandwidth of most networks, a network element must be able to process more than two packets in a single clock.

Some current solutions can handle two packets in a single cycle in a four hundred (400) gigabit (G) system. However, this involves processing the end of one packet and the start of the next packet and then a single packet is sent through the system. Some other current solutions increase the frequency of the CPU to handle increased bandwidth.

The disadvantage of the current solutions is that the process at the start is handling two packet segments, but at the end is handling a single packet. Hence to scale this solution, the only option is to increase the frequency of the CPU. More specifically, a four hundred (400) G system may run at eight hundred (800) MHz which means an eight hundred (800) G system would need to run at 1600 MHz.

This presents additional issues as the timing can be hard to close. Doubling the clock frequency of the system by two (2) every time the bandwidth or network speed doubles is not sustainable. What is needed is a system and method to allow for scalable packet processing.

A device to help facilitate scalable packet processing, as outlined in FIG. 1, can resolve these issues (and others). In an example, system 100 can be configured to allow two full packets and/or three or more packets to be processed in a single clock cycle without scaling the frequency of the network element to match the network speed. The phrase "three or more packets to be processed in a single clock cycle," "three or more packets processed in a single clock cycle," and other similar phrases means the end of one packet may be processed, at least one full second packet may be processed (i.e., 1, 2, 3, 4 . . . full packets may be processed), and the beginning of a third packet may be processed. For example, a network element running at eight hundred (800) MHz and connected to a four hundred (400) G Ethernet connection could scale to a 1.6 TB Ethernet connection while still processing three or more packets per eight hundred (800) MHz clock cycle. In a specific example, a network element coupled to a 1.6 TB Ethernet connection has a two-hundred and fifty-six (256) byte data path and operates at eight hundred (800) MHz. In a single clock, the system can parse packets in a data stream and identify the location of the end of any packet currently being processed and the start and the end of packet of any other packets in the two-hundred and fifty-six (256) byte data path. In addition, in the same clock cycle, the system can route any previously unfinished packet of a unit that can complete the packets processing, any complete sixty-four (64) byte or larger packets to a unit for processing, and any started packed packet to a unit for processing when the remaining packet segments arrive, perform processing on all valid segments in parallel, and pass multiple valid packets to be processed further down the pipe.

In a specific example, the bus width of the network element is thirty-two (32) bytes and can process two parts of the same packet on the same clock. This relatively simple architecture scales to the significantly more complex 1.6 TB Ethernet, where the bus width of the network element increases to two hundred and fifty-six (256) bytes and up to four (4) packets can be processed in a single cycle. Further, the scale of the architecture can go well beyond 1.6 TB. For example, for a 6.4 TB Ethernet, the bus width of the network element can increase to 1,024 bytes and up to sixteen (16) packets can be processed in a single cycle.

Turning to the infrastructure of FIG. 1, system 100 in accordance with an example embodiment is shown. Generally, system 100 may be implemented in any type or topology of networks. Network 104 represents a series of points or nodes of interconnected communication paths for receiving and transmitting packets of information that propagate through system 100. Network 104 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, network elements 102a-102c, are meant to encompass network elements, network appliances, servers, routers, switches, gateways, bridges, load balancers, processors, modules, or any other suitable device, component, element, or object operable to exchange information in a network environment. Network elements 102a-102c may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of network elements 102a-102c may be virtual or include virtual elements.

In regard to the internal structure associated with system 100, each of network elements 102a-102c can include memory elements (e.g., memory 106) for storing information to be used in the operations outlined herein. Each of network elements 102a-102c may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media or machine-readable media. In some of these instances, memory elements can store data used for the operations described herein. This includes the memory elements being able to store software, logic, code, or processor instructions that are executed to carry out the activities described herein.

In an example implementation, elements of system 100, such as network elements 102a-102c may include software modules (e.g., processing engine 116, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102a-102c may include one or more processors (e.g., CPU 108) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2A:
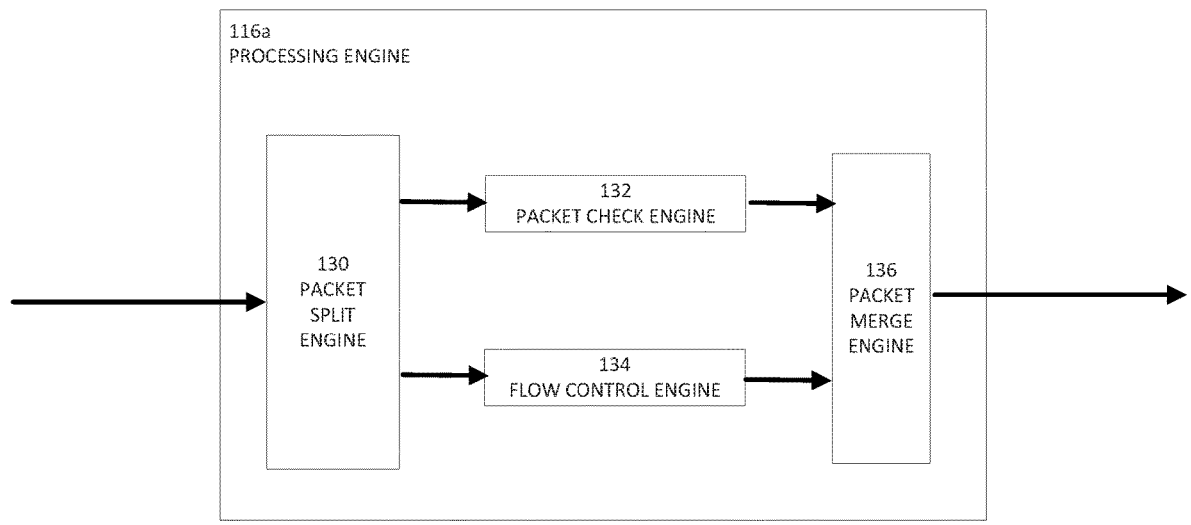
FIG. 2A is a block diagram of a portion of a system to enable scalable packet processing, in accordance with an embodiment of the present disclosure.

Turning to FIG. 2A, FIG. 2A is a simplified block diagram of an example of processing engine 116. As illustrated in FIG. 2A, processing engine 116a can include a packet split engine 130, a packet check engine 132, a flow control engine 134, and a packet merge engine 136. In an example, a data stream is received by a processing engine 116a. Packet split engine 130 can be configured to split the data steam into separate channels of N bytes each or packet streams. The packets are separated from the data stream at their packet boundaries and a copy of the flow is made. One copy is sent to packet check engine 132 and the other copy is sent to flow control engine 134.

Packet check engine 132 is configured to handle the packet information and flow control engine 134 is configured to handle the flow control information for each packet. In packet check engine 132, the packets are being checked while flow control engine 134 determines how and/or where the packets are to be communicated. More specifically, for each packet in the data stream, packet check engine 132 is configured to perform a CRC, min and max length check, and other checks. In a specific example, packet check engine 132 is configured to perform checks that are part of the IEEE standard checks for the packets in the data stream. In some examples, the output of packet check engine 132 can include flags indicating if the data going through was in order (e.g., a two hundred and fifty-six (256) byte data chuck or four (4) parts of a large packet). Flow control engine 134 is configured to identify pause or priority flow control packets (e.g., as part of the IEEE standard). More specifically, for each packet in the data stream, flow control engine 134 is configured to parse the packet and determine if it is a wake on LAN, priority flow control, pause packet (e.g., IEEE 802.3X), etc. Packet merge engine 136 can be configured to merge the packets in the separate data streams in the order they were received and communicate the packets to the correction or next destination. It should be noted that different protocols have packet checks and flow controls and the above examples are not limiting.

Figure 2B:
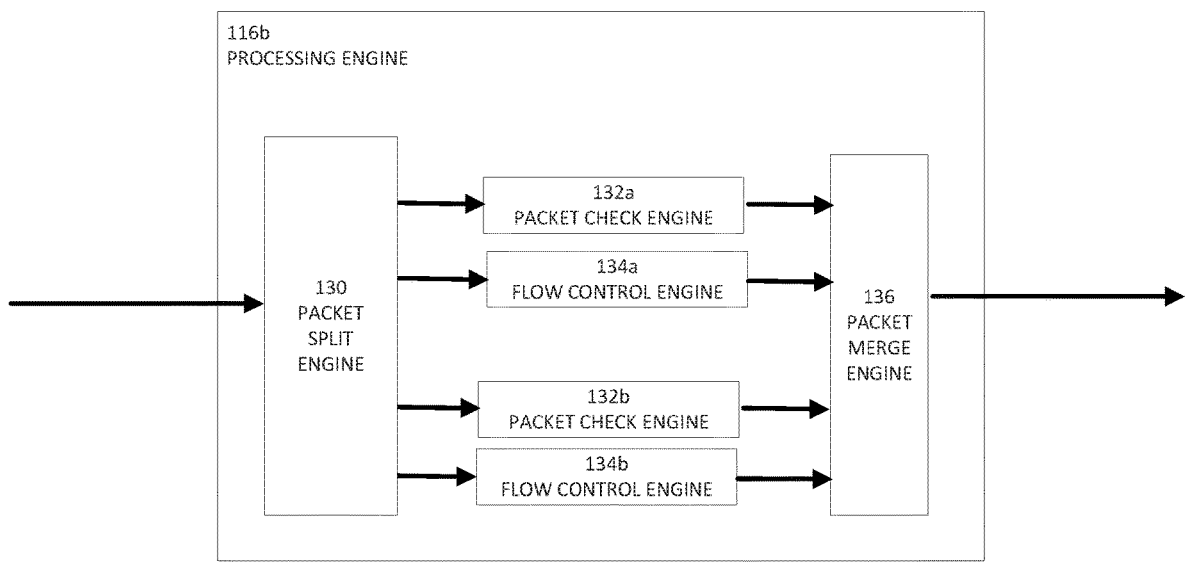
FIG. 2B is a block diagram of a portion of a system to enable scalable packet processing, in accordance with an embodiment of the present disclosure.

Turning to FIG. 2B, FIG. 2B is a simplified block diagram of an example of processing engine 116. As illustrated in FIG. 2B, processing engine 116b can include packet split engine 130, a first packet check engine 132a, a second packet check engine 132b, a first flow control engine 134a, a second flow control engine 134b, and packet merge engine 136. In an example, a data stream is received by processing engine 116b.

Packet split engine 130 can be configured to split the data steam into separate channels of N bytes each or packet streams. For example, the data in the data stream is split into two separate packets streams. The packets are separated from the data stream at their packet boundaries and a copy of the flow is made. One copy of the packets in the first data stream are sent to packet check engine 132a and the other copy is sent to flow control engine 134a while one copy of the packets in the second data stream are sent to packet check engine 132b and the other copy is sent to flow control engine 134b. By adding a packet check engine 132 and a flow control engine 134 to accommodate an increase in the bus size, system 100 can be configured to accommodate scalable packet processing.

Figure 3A:
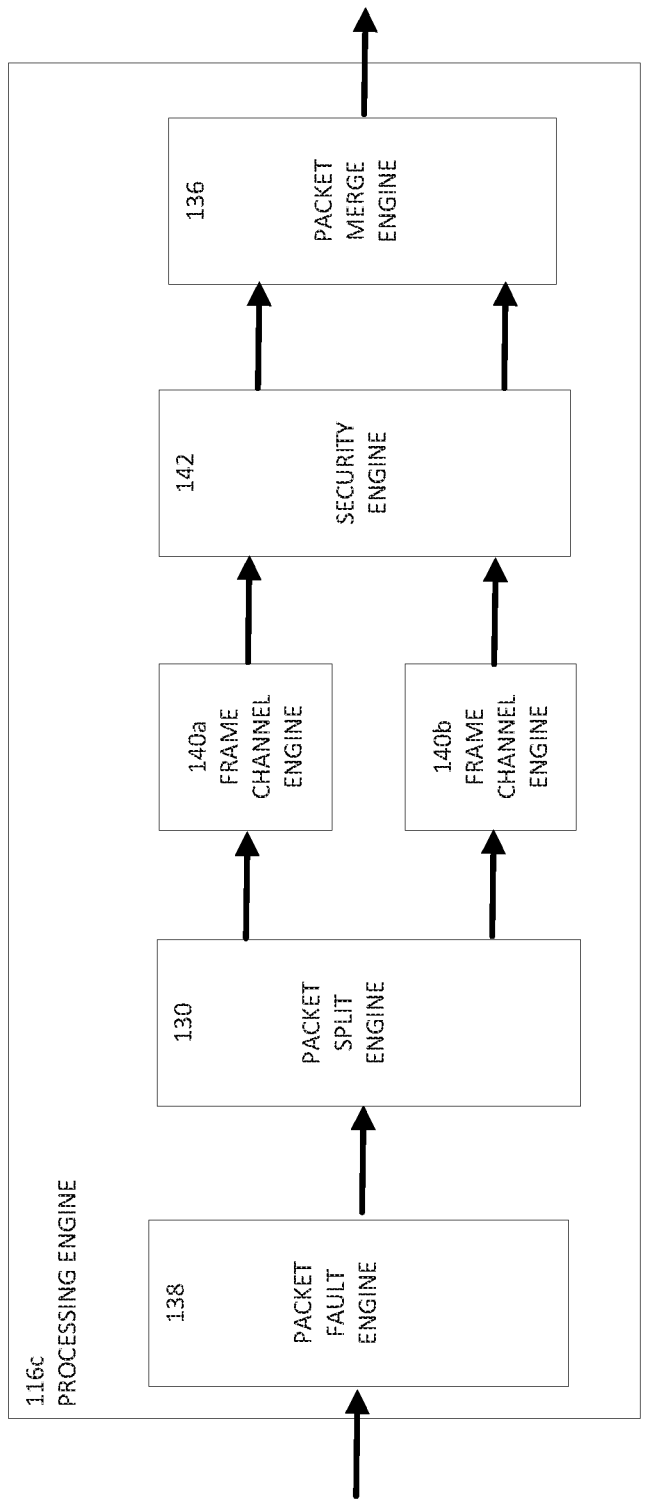
FIG. 3A is a block diagram of a portion of a system to enable scalable packet processing, in accordance with an embodiment of the present disclosure.

Turning to FIG. 3A, FIG. 3A is a simplified block diagram of an example of processing engine 116. As illustrated in FIG. 3A, processing engine 116c can include a packet fault engine 138, packet split engine 130, one or more frame channel engines 140a and 140b, a security engine 142 (e.g., a media access control (MAC) security engine), and packet merge engine 136. In an example, a data stream is received by a processing engine 116c.

For each packet in the data stream, packet fault engine 138 can be configured to determine fault detection, idle detection, alignment, code errors, preamble detection, start and end frame detection, low power idle, run deletion, wake on LAN, etc. Packet split engine 130 can be configured to split the data steam into separate channels of N bytes each or packet streams. The packets are separated from the data stream at their packet boundaries.

Each frame channel engine 140a and 140b can be configured to handle the packet information. More specifically, each frame channel engine 140a and 140b is configured to perform a CRC, min and max length check, and other checks. In a specific example, each frame channel engine 140a and 140b is configured to perform checks that are part of the IEEE standard checks for the packets in the data stream. In addition, each frame channel engine 104a and 140b can be configured to handle the flow control information for each packet. In another example, the flow control information may be processed downstream.

Security engine 142 can be configured to verify security keys, perform data integrity checks, handle encryption, etc. In an example of four (4) different packets, each packet may have a different set of encryption parameters. Security engine 142 could be four (4) different blocks or configured to independently process the four (4) different packets in a single clock cycle. In addition, security engine 142 is able to process the packets in the order that they arrived at the network element. In an example, security engine 142 may be a MAC security engine. MAC security includes a Layer 2 encryption that goes between two different link partners. In some examples, processing engine 116c does not include a security engine 142.

In a specific example, the bus width of the network element that includes processing engine 116c is thirty-two (32) bytes and can process two parts of the same packet on the same clock. This simple architecture scales to the significantly more complex 1.6 TB Ethernet connection, where the bus width of the network element increases to two hundred and fifty-six (256) bytes and up to four (4) packets can be processed in a single cycle.

Figure 3B:
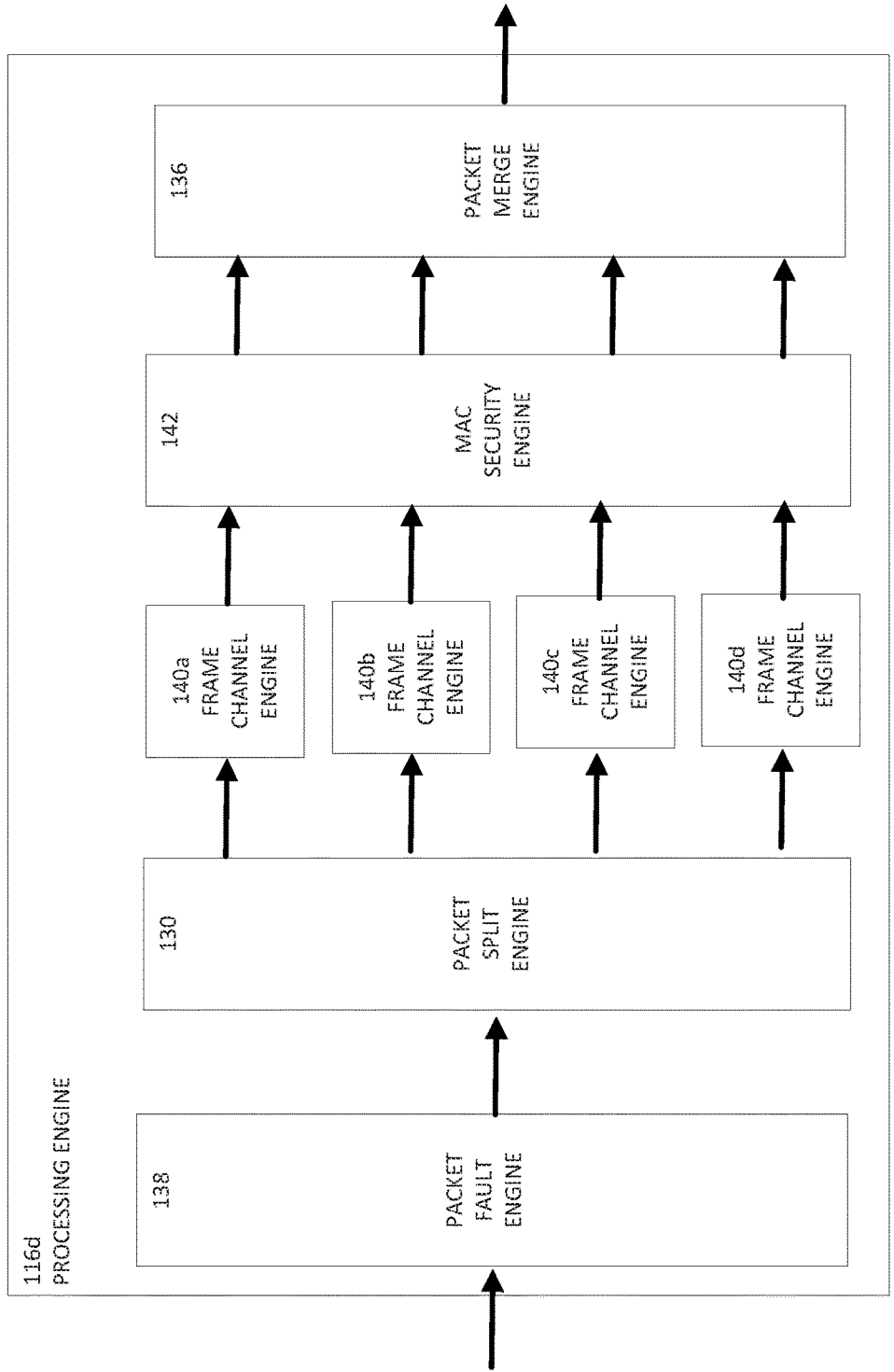
FIG. 3B is a block diagram of a portion of a system to enable scalable packet processing, in accordance with an embodiment of the present disclosure.

Turning to FIG. 3B, FIG. 3B is a simplified block diagram of an example of processing engine 116. As illustrated in FIG. 3B, processing engine 116d can include a packet fault engine 138, packet split engine 130, one or more frame channel engines 140a-140d, a security engine 142 (e.g., a MAC security engine), and packet merge engine 136. Each frame channel engine 140a-140d can be configured to handle the packet information. More specifically, each frame channel engine 140a-140d is configured to perform a CRC, min and max length check, and other checks. In a specific example, each frame channel engine 140a-140d is configured to perform checks that are part of the IEEE standard checks for the packets in the data stream. In addition, each frame channel engine 140a-140d can be configured to handle the flow control information for each packet. In another example, the flow control information may be processed downstream. By adding a frame control engine 140 to accommodate an increase in the bus size, system 100 can be configured to accommodate scalable packet processing.

In an example, packet check engine 132 (illustrated in FIG. 2), flow control engine 134 (illustrated in FIG. 2), or the frame channel engine (e.g., frame channel engine 140a) can be configured to manage the end or middle of any frame that was not completed on the previous bus. For example, a two hundred and fifty-seven (257) byte packet could be processed as two hundred and fifty-six (256) bytes on the first clock cycle by one frame channel engine. Then on the second clock cycle, the first frame channel engine would complete the processing of the packet from the previous cycle.

Turning to FIG. 4A, FIG. 4A is a simplified block diagram of an example of frame channel engine 140e. As illustrated in FIG. 4A, frame channel engine 140e can include a fault engine 144, a packet CRC engine 146, a packet analysis engine 148, an S2P 150, a receive control 152, a receive parse 154, and a receive filter 156. Fault engine 144 can be configured to determine fault detection, idle detection, alignment, code errors, preamble detection, start and end frame detection, low power idle, run deletion, wake on LAN, etc. Packet split engine 130 can be configured to split the data steam into separate channels of N bytes each or packet streams. The packets are separated from the data stream at their packet boundaries. As the packets move through frame channel engine 140e, metadata can be created, changed, altered, removed, and/or passed along with each packet. The metadata associated with each packet and/or packet contents could include a timestamp, metadata related to length, cyclic redundancy check (CRC) error, parsed information, header information, etc.

Packet CRC engine 146 can be configured to protect against common types of errors and provide relatively quick and reasonable assurance of the integrity of packets. CRC is an error-detecting code to detect accidental changes to raw data. Some blocks of data have a short check value attached, based on the remainder of a polynomial division of their contents. Packet CRC engine 146 can be configured to repeat the calculation and, in the event the check values do not match, the block contains a data error and corrective action can be taken against data corruption.

Packet analysis engine 148 can be configured to handle the packet information. More specifically, packet analysis engine 148 is configured to perform a CRC, min and max length check, and other checks. In a specific example, packet analysis engine 148 is configured to perform checks that are part of the IEEE standard checks for the packets in the data stream. In addition, packet analysis engine 148 can be configured to handle the flow control information for each packet or the flow control information may be processed downstream.

S2P 150 can be configured to perform serialization of packet chunks. In a specific illustrative example, the packets are serialized in 32-byte chunks with the last chunk having 1 to 32 valid bytes. The first thirty-two (32) byte chunk of each packet appears on the i_sox_ndata, and is an even chunk. The rest of the packet appears on i_pip_ndata, and the first chunk is odd. The start of the next packet may be coincident with the end of the current packet, so i_sox_ndata and i_pip_ndata can be valid in the same cycle, but are not in the same packet. Packet data is converted to a 64-byte format by caching the even chunks, then concatenating even and odd chunks. Even chunks map to output bytes [0:31], and odd chunks directly map to output bytes [32:63]. The last chunk of the packet, even if it is even, is not cached since there is only one packet per cycle on the output. Note that other means may be used perform serialization of packet chunks.

Receive control 152 can be configured to support pause flow control, priority flow control (PFC), or no flow control depending on the currently configured mode. In a pause mode, receive control 152 can act upon pause packets. In PFC mode, receive control 152 can act upon priority flow control packets. If there is no flow control, receive control 152 does not act upon the control packets, however, it may still drop or forward them, dependent on the configuration.

Receive parse 154 can be configured to parse packets to determine priority and the information can be encoded as a traffic class and used by subsequent functions. In an example, receive parse 154 can have a valid/enable flow control so there is no packet data loss due to underrun or overrun in receive parse 154. Receive filter 156 can be configured to filter packets (e.g., filtering traffic classes, filtering packets by header information, filtering out packets that need to be dropped, etc.).

Figure 4B:
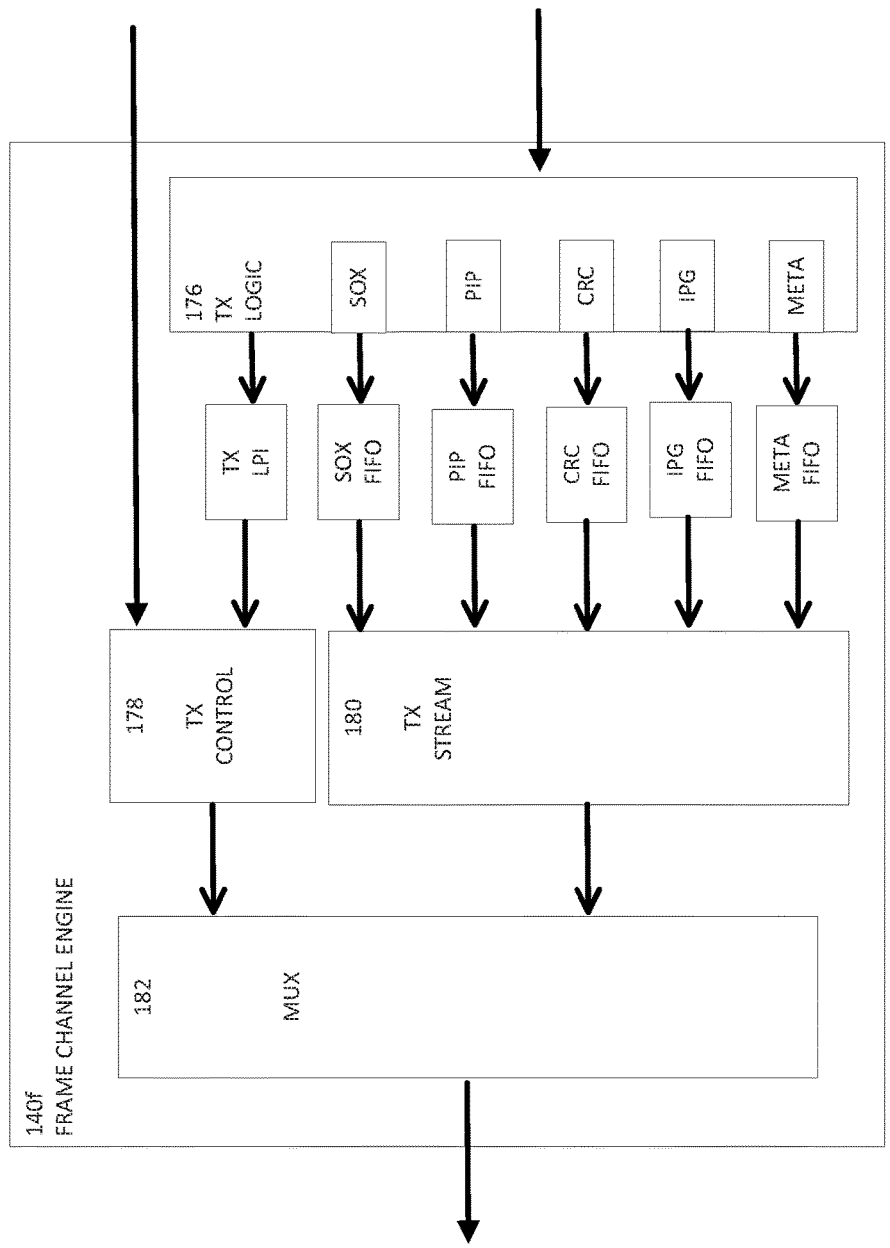
FIG. 4B is a block diagram of a portion of a system to enable scalable packet processing, in accordance with an embodiment of the present disclosure.

Turning to FIG. 4B, FIG. 4B is a simplified block diagram of an example of frame channel engine 140*f*. While frame channel engine 140*e* in FIG. 4A is illustrated in a receive direction, frame channel engine 140*f* is illustrated in the transmit direction. The transmit direction configuration is similar but in the opposite direction and in the transmit direction, frame channel engine 140*f* may include padding (e.g., Ethernet packets require sixty-four (64) bytes and a thirty-two (32) byte packet may need padding before being communicated on an Ethernet connection). Also, in the transmit direction, frame channel engine 140*f* may include preamble verification, fault generation, interframe gap, etc.

For example, as illustrated in FIG. 4B, frame channel engine 140*f* can include transmit logic engine 176, transmit control engine 178, transmit stream engine 180, and multiplexer (MUX) 182. Transmit logic engine 176 can be configured to receive data and prepare the data for transmitting over a network. For example, transmit logic engine 176 can include a start of data packet or frame module, cyclic redundancy check module, interpacket gap module, metadata module, etc. Transmit logic engine 176 can communicate data to a plurality of first-in-first-out (FIFO) buffers and the FIFO buffers can communicate the data to transmit stream engine 180. Transmit stream engine 180 can receive the data from transmit logic engine 176 and create packets for communication over the network. Transmit control engine 178 can include control logic for the packets. The data from transmit control engine 178 and transmit stream engine 180 can be sent to MUX 182 where the data is combined and the packets are communicated over the network. As the packets move through frame channel engine 140*f*, metadata can be created, changed, altered, removed, and/or passed along with each packet. The metadata associated with each packet and/or packet contents could include a timestamp, metadata related to length, cyclic redundancy check (CRC) error, parsed information, header information, etc.

Figure 5:
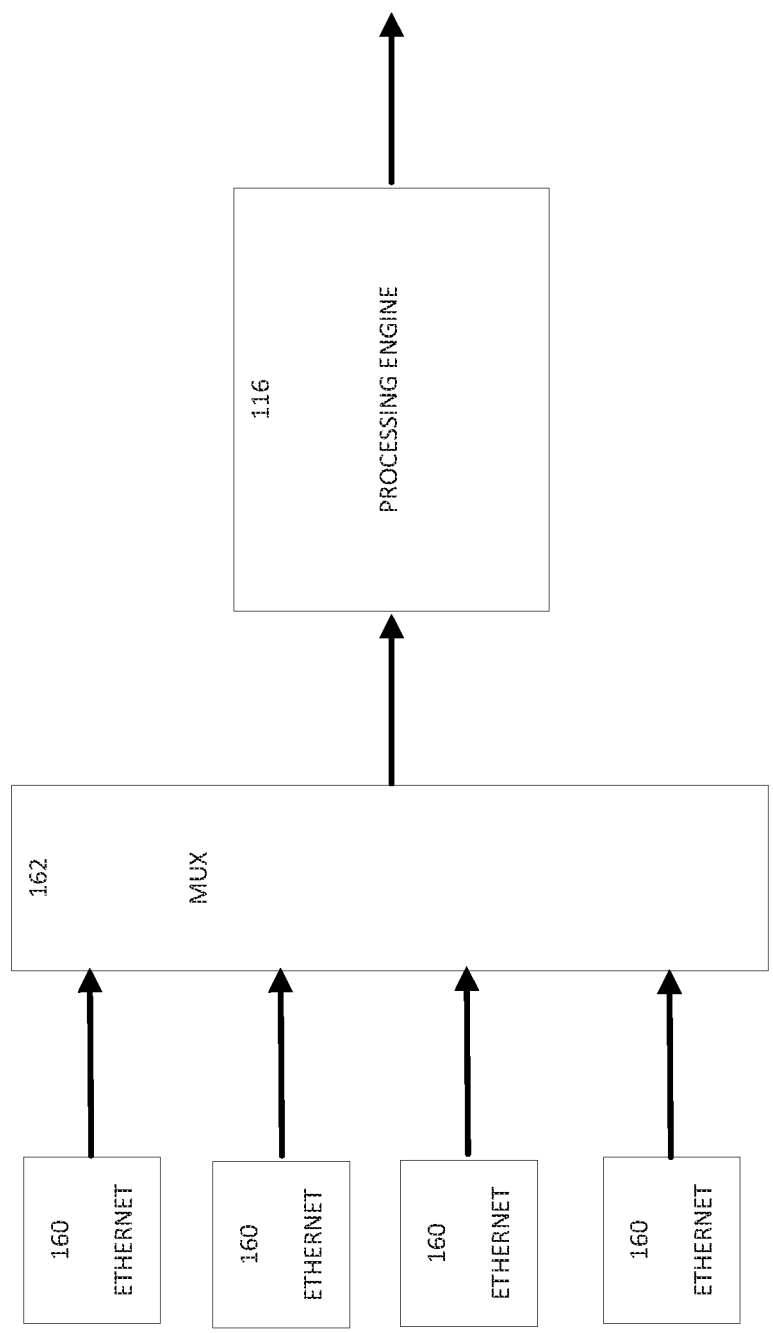
FIG. 5 is a block diagram of a portion of a system to enable scalable packet processing, in accordance with an embodiment of the present disclosure.

Turning to FIG. 5, FIG. 5 is a simplified block timing diagram in accordance with an embodiment of the present disclosure. In an example, two or more Ethernet channels 160 may be combined into a single channel using a MUX 162. As illustrated in FIG. 5, there are four (4) ports of Ethernet channels 160 communicating with MUX 162. Each of Ethernet channels 160 may be up to two hundred (200) G. MUX 162 may be a time-division multiplexing (TDM) structure. TDM is a method of transmitting and receiving independent signals over a common signal path by means of synchronized switches at each end of the transmission line so that each signal appears on the line only a fraction of time in an alternating pattern. TDM is used when the bit rate of the transmission medium exceeds that of the signal to be transmitted. The packets in the data stream from MUX 162 can be processed by processing engine 116 in the order they were received by MUX 162.

Turning to FIG. 6, FIG. 6 is a simplified table 164 illustrating example details related to an embodiment of the present disclosure. Table 164 includes a raw speed column 166, a ports column 168, a possible packets column 170, and a width column 172. For a network element with a CPU operating at eight hundred (800) MHz, raw speed column 166 illustrates the raw Ethernet speed, ports column 168 illustrates the number of ports (P), possible packets column 170 illustrates the number of possible packets in a single clock cycle, and width column 172 illustrates the maximum width of the packet needed for the bus of the network element.

With a 1.6 TB Ethernet connection, system 100 allows for parallel units that allow from a single two hundred and fifty-six (256) byte packet (or up to two hundred and fifty-six (256) additional bytes of the previous packet) to be processed. System 100 also allows, in parallel, a packet to be completed in one packet processing unit, two more packets to be processed in separated packet processing units, and a fourth packet to begin packet processing. In an eight hundred (800) G Ethernet connection, system 100 allows for parallel units that allow from a single one hundred and twenty-eight (128) byte packet (or up to one hundred and twenty-eight (128) additional bytes of the previous packet) to be processed. It should be noted that the values in table 164 are for illustration purposes. For example, other designs could have different frequencies, more or fewer ports, etc. More specifically, other systems could support eight (8) ports at two hundred (200) Gigabits per-second (Gbps), thirty-two (32) ports at fifty (50) Gbps, etc.

Figure 7:
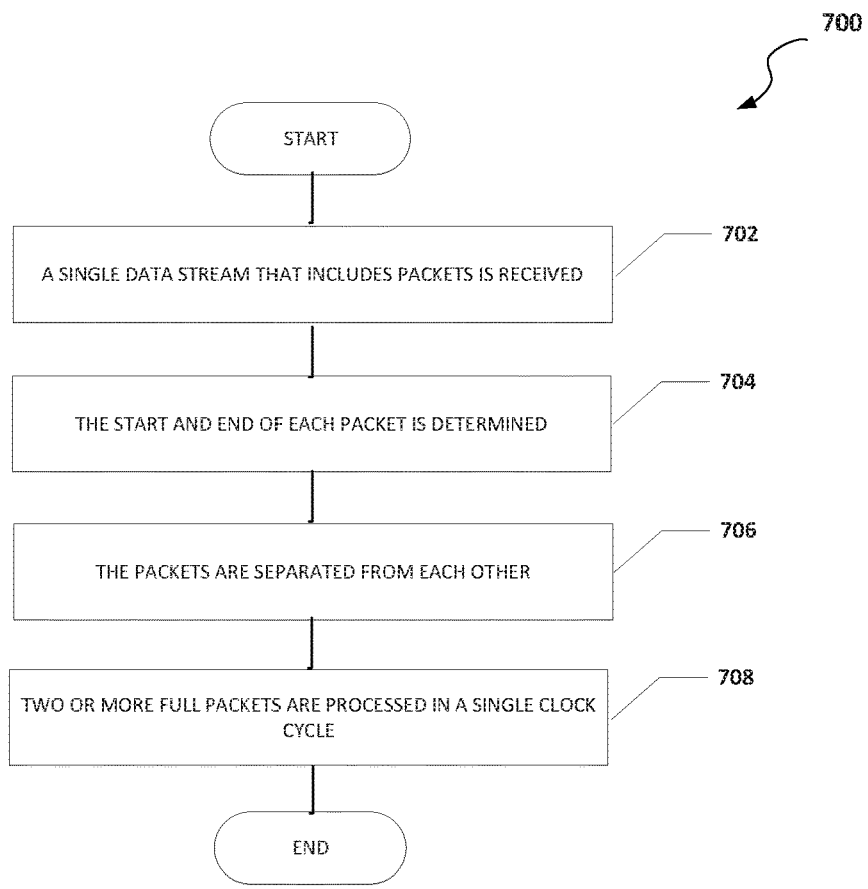
FIG. 7 is a flowchart illustrating potential operations that may be associated with the system in accordance with an embodiment.

Turning to FIG. 7, FIG. 7 is an example flowchart illustrating possible operations of a flow 700 that may be associated with scalable packet processing, in accordance with an embodiment. In an embodiment, one or more operations of flow 700 may be performed by processing engine 116. At 702, a single data stream that includes packets is received. In an example, the data stream is an Ethernet data stream received by a NIC (e.g., NIC 118a). At 704, the start and end of each packet is determined. At 706, the packets are separated from each other. At 708, two or more full packets are processed in a single clock cycle. For example, a packet split engine 130 may determine the start and end of each packet in the data stream and communicate each packet to a packet check engine 132 or frame channel engine 140 for processing. In another example, three or more packets are processed in a single clock cycle. For example, the end of one packet may be processed, a full second packet may be processed, and the beginning of a third packet may be processed.

Figure 8:
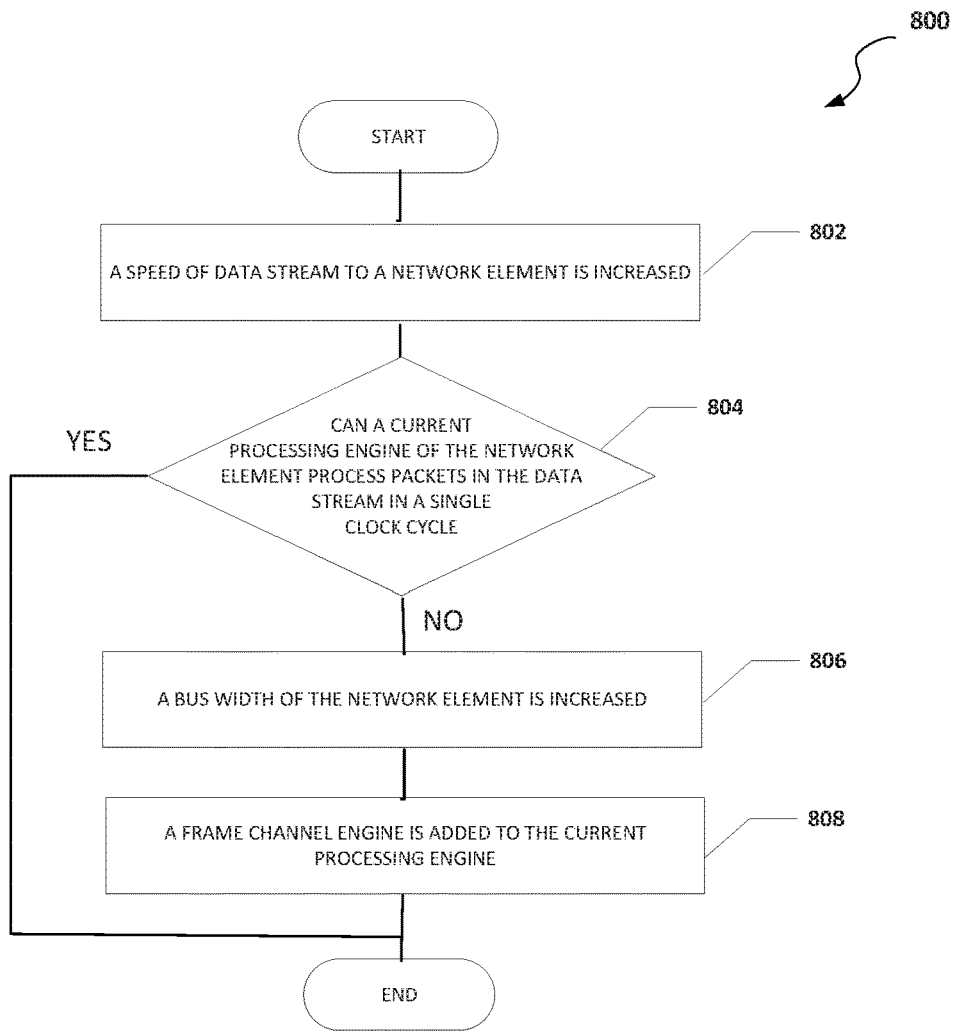
FIG. 8 is a flowchart illustrating potential operations that may be associated with the system in accordance with an embodiment.

Turning to FIG. 8, FIG. 8 is an example flowchart illustrating possible operations of a flow 800 that may be associated with scalable packet processing, in accordance with an embodiment. In an embodiment, one or more operations of flow 800 may be performed by processing engine 116. At 802, a speed of a data stream to a network element is increased. For example, a network element may be in a network and the network communications may be increased from a four hundred (400) G Ethernet connection to a 1.6 TB Ethernet connection. At 804, the system determines if a current processing engine of the network element can process packets in the data stream in a single clock cycle. If the current processing engine of the network element cannot process packets in the data stream in a single clock cycle, then a bus width of the network element is increased, as in 806. For example, the hardware of the network element may be replaced to accommodate the increased speed of the Ethernet connection. At 808, a frame channel engine is added to the current processing engine. The addition of the frame channel engine will allow the processing engine to process an additional packet in the single clock cycle. In an example, instead of a frame channel engine, a packet check engine can be added to the processing engine. In another example, instead of a frame channel engine, a packet check engine and a flow control engine can be added to the processing engine.

It is also important to note that the operations in the preceding flow diagrams (i.e., FIGS. 7 and 8) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. For example, the values in table 164 are for illustration purposes and other designs could have more or fewer ports. In addition, the scaling could continue beyond 1.6 TB (e.g., other power of two(s) such as 100 GHz like 3.2 TB, 6.4 TB, 12.8 TB, 25.6 TB, 51.2 TB, 102.4 TB, etc., or non-powers of two such as 1 TB, 2.5 TB, 5 TB, 10 TB, 25 TB, 50 TB, 100 TB, etc.) and may include tens or hundreds of processing engines, packet check engines, flow control engines, channel frame engines, etc. Additionally, although system 100 has been illustrated with reference to particular elements and operations that facilitate the communication process, these elements and operations may be replaced by any suitable architecture, protocols, and/or processes that achieve the intended functionality of system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable medium having one or more instructions that when executed by at least one processor, cause the at least one processor to receive a data stream, parse packets in the data stream and identify a start and an end of each packet in the packet stream, and process at least two (2) full packets from the data stream in a single clock cycle.

In Example C2, the subject matter of Example C1 can optionally include where the packets in the data stream are Ethernet packets.

In Example C3, the subject matter of any one of Examples C1-C2 can optionally include where he data stream is at least a two hundred (200) gigabit Ethernet data stream and a bus width is at least thirty-two (32) bytes.

In Example C4, the subject matter of any one of Examples C1-C3 can optionally include where the packets are processed using at least two (2) frame channel engines.

In Example C5, the subject matter of any one of Examples C1-C4 can optionally include one or more instructions that, when executed by at least one processor, causes the at least one processor to process at least four (4) full packets in the single clock cycle.

In Example C6, the subject matter of any one of Examples C1-05 can optionally include where the data stream is at least 1.6 terabit data stream and a bus width is at least two hundred and fifty-six (256) bytes.

In Example C7, the subject matter of any one of Examples C1-C6 can optionally include where the at least one machine readable medium is part of a data center.

In Example A1, an electronic device can include memory, a processing engine, and at least one processor. The processing engine is configured to cause the at least one processor to receive a data stream, parse packets in the data stream and identify a start and an end of each packet in the packet stream, and process at least one (1) full packet and two (2) partial packets from the data stream in a single clock cycle.

In Example A2, the subject matter of Example A1 can optionally include where the data stream is at least a two hundred (200) gigabit Ethernet data stream and a bus width is at least thirty-two (32) bytes.

In Example A3, the subject matter of any one of Examples A1-A2 can optionally include where the processing engine includes two (2) frame channel engines.

In Example A4, the subject matter of any one of Examples A1-A3 can optionally include where the processing engine is further configured to cause the at least one processor to process at least four (4) packets in the single clock cycle.

In Example A5, the subject matter of any one of Examples A1-A4 can optionally include where the data stream is at least 1.6 terabit data stream and a bus width is at least two hundred and fifty-six (256) bytes.

Example M1 is a method including receiving a data stream, parse packets in the data stream and identify a start and an end of each packet in the packet stream, and processing at least two (2) full packets from the data stream in a single clock cycle.

In Example M2, the subject matter of Example M1 can optionally include where the data stream is at least a two hundred (200) gigabit Ethernet data stream and a bus width is at least thirty-two (32) bytes.

In Example M3, the subject matter of any one of the Examples M1-M2 can optionally include where the packets are processed using a frame channel engine.

In Example M4, the subject matter of any one of the Examples M1-M3 can optionally include processing at least four (4) full packets from the data stream in the single clock cycle.

In Example M5, the subject matter of any one of the Examples M1-M4 can optionally include increasing a bus width to two hundred and fifty-six (256) bytes.

In Example M6, the subject matter of any one of Examples M1-M5 can optionally include performing a media access control security check on the at least two (2) full packets.

Example S1 is a system for scalable packet processing. The system can include memory, one or more processors operating at eight hundred (800) megahertz, and a processing engine. The processing engine is configured to receive a data stream, parse packets in the data stream and identify a start and an end of each packet in the packet stream, and process at least two (2) full packets from the data stream in a single clock cycle.

In Example S2, the subject matter of Example S1 can optionally include where the at least two (2) full packets are an Ethernet packets.

In Example S3, the subject matter of any one of the Examples S1-52 can optionally include where the data stream is at least a two hundred (200) gigabit Ethernet data stream and a bus width is at least thirty-two (32) bytes.

In Example S4, the subject matter of any one of the Examples S1-53 can optionally include where the processing engine is further configured to process at least four (4) packets in the single clock cycle.

In Example S5, the subject matter of any one of the Examples S1-54 can optionally include where the data stream is at least 1.6 terabit data stream and a bus width is at least two hundred and fifty-six (256) bytes.

In Example S6, the subject matter of any one of the Examples S1-55 can optionally include where the processing engine is further configured to perform a media access control security check on the at least two (2) full packets.

In Example S7, the subject matter of any one of the Examples S1-56 can optionally include where the system is part of a data center.

Example AA1 is an apparatus including at least one processor operating at eight hundred (800) megahertz and means for receiving a data stream, means for parsing packets in the data stream and identify a start and an end of each packet in the packet stream, and means for processing at least two (2) full packets from the data stream in a single clock cycle.

In Example AA2, the subject matter of Example AA1 can optionally include where the packets in the data stream are Ethernet packets.

In Example AA3, the subject matter of any one of Examples AA1-AA2 can optionally include where the data stream is at least a two hundred (200) gigabit Ethernet data stream and a bus width is at least thirty-two (32) bytes.

In Example AA4, the subject matter of any one of Examples AA1-AA3 can optionally include where the packets are processed using at least two (2) frame channel engines.

In Example AA5, the subject matter of any one of Examples AA1-AA4 can optionally include means for processing at least four (4) full packets in the single clock cycle.

In Example AA6, the subject matter of any one of Examples AA1-AA5 can optionally include the data stream is at least 1.6 terabit data stream and a bus width is at least two hundred and fifty-six (256) bytes.

In Example AA7, the subject matter of any one of Examples AA1-AA6 can optionally include where he at least one machine readable medium is part of a data center.

Example X1 is a machine-readable storage medium including machine-readable instructions to implement a method or realize an apparatus as in any one of the Examples A1-A5, AA1-AA7, or M1-M6. Example Y1 is an apparatus comprising means for performing any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device comprising:
   memory;
   a processing engine; and
   at least one processor, operating at eight hundred (800) megahertz, wherein the processing engine is configured to cause the at least one processor to:
   receive a data stream, wherein the data stream is at least a two hundred (200) gigabit Ethernet data stream and a bus width is at least thirty-two (32) bytes;
   parse packets in the data stream and identify a start and an end of packets in the data stream; and
   process at least two (2) full packets from the data stream in a single clock cycle.

2. The electronic device of claim 1, wherein the processing engine includes two (2) frame channel engines.

3. The electronic device of claim 1, wherein the processing engine is configured to cause the at least one processor to:
   process at least four (4) packets in the single clock cycle.

4. The electronic device of claim 3, wherein the data stream is at least 1.6 terabit data stream and a bus width is at least two hundred and fifty-six (256) bytes.

5. The electronic device of claim 1, wherein the at least two (2) full packets are Ethernet packets.

6. The electronic device of claim 1, wherein the electronic device is part of a data center.

7. The electronic device of claim 1, wherein the processing engine is configured to cause the at least one processor to:
   perform a media access control security check on the at least two (2) full packets.

8. At least one non-transitory machine readable medium comprising one or more instructions that, when executed by at least one processor operating at eight hundred (800) megahertz, causes the at least one processor to:
   receive a data stream, wherein the data stream is at least a two hundred (200) gigabit data stream and a bus width is at least thirty-two (32) bytes;
   parse packets in the data stream and identify a start and an end of packets in the data stream; and
   process at least one (1) full packet and two (2) partial packets from the data stream in a single clock cycle.

9. The at least one non-transitory machine readable medium of claim 8, wherein the packets in the data stream are Ethernet packets.

10. The at least one non-transitory machine readable medium of claim 8, wherein the packets are processed using at least two (2) frame channel engines.

11. The at least one non-transitory machine readable medium of claim 8, comprising one or more instructions that, when executed by at least one processor, causes the at least one processor to:
    process at least four (4) full packets in the single clock cycle.

12. The at least one non-transitory machine readable medium of claim 11, wherein the data stream is at least 1.6 terabit data stream and a bus width is at least two hundred and fifty-six (256) bytes.

13. The at least one non-transitory machine readable medium of claim 8, wherein the at least one machine readable medium is part of a data center.

14. A method comprising:
    receiving a data stream;
    parsing packets in the data stream and identifying a start and an end of packets in the data stream; and
    processing at least two (2) full packets from the data stream in a single clock cycle, wherein the packets are processed using a frame channel engine.

15. The method of claim 14, wherein the data stream is at least a two hundred (200) gigabit Ethernet data stream and a bus width is at least thirty-two (32) bytes.

16. The method of claim 14, further comprising:
    processing at least four (4) full packets from the data stream in the single clock cycle.

17. The method of claim 16, further comprising:
    increasing a bus width to two hundred and fifty-six (256) bytes.

18. The method of claim 14, further comprising:
    performing a media access control security check on the at least two (2) full packets.

19. A system for scalable packet processing, the system comprising:
    memory;
    one or more processors operating at eight hundred (800) megahertz; and
    a processing engine, wherein the processing engine is configured to:
    receive a data stream;
    parse packets in the data stream and identify a start and an end of packets in the data stream; and
    process at least four (4) packets from the data stream in a single clock cycle.

20. The system of claim 19, wherein the at least four (4) packets includes at least two (2) full packets.

21. The system of claim 20, wherein the at least two (2) full packets are Ethernet packets.

22. The system of claim 19, wherein the data stream is at least a two hundred (200) gigabit Ethernet data stream and a bus width is at least thirty-two (32) bytes.

23. The system of claim 19, wherein the data stream is at least 1.6 terabit data stream and a bus width is at least two hundred and fifty-six (256) bytes.

24. The system of claim 19, wherein the processing engine is further configured to:
    perform a media access control security check on the at least four (4) packets.

25. The system of claim 19, wherein the system is part of a data center.

* * * * *